United States Patent
Relyea (10) Patent No.: US 8,332,637 B2
(45) Date of Patent: Dec. 11, 2012

(54) METHODS AND SYSTEMS FOR NONCE GENERATION IN A TOKEN

(75) Inventor: Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1186 days.

(21) Appl. No.: 11/447,176

(22) Filed: Jun. 6, 2006

(65) Prior Publication Data

US 2007/0283163 A1 Dec. 6, 2007

(51) Int. Cl.
*G06F 21/00* (2006.01)

(52) U.S. Cl. ............. 713/166; 713/168; 713/185; 726/7

(58) Field of Classification Search .................. 713/153, 713/159, 168, 172, 173, 184, 185; 726/2, 726/5, 9, 10, 14, 20, 27–29
See application file for complete search history.

(56) References Cited

U.S. PATENT DOCUMENTS

| | | |
|---|---|---|
| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |
| 5,862,310 A | 1/1999 | Crawford et al. |
| 5,923,884 A | 7/1999 | Peyret et al. |
| 5,937,066 A | 8/1999 | Gennaro et al. |

(Continued)

FOREIGN PATENT DOCUMENTS

WO 9724831 7/1997

(Continued)

OTHER PUBLICATIONS

ATM and Credit Card Notification, Feb. 2005 (internet archive) pp. 1-2 www.thereareplaces.com/infgdes/money.atmnotif.htm.

(Continued)

*Primary Examiner* — Gilberto Barron, Jr.
*Assistant Examiner* — Abdulhakim Nobahar
(74) *Attorney, Agent, or Firm* — Lowenstein Sandler PC (57) ABSTRACT

Embodiments of the present invention provide a method, a client and a token for providing a nonce during a login associated with the token in a multi-user computer system. A login process is activated after token insertion by a request to execute a user privileged operation made by a client application process. If a password provided to the login process by an access requester associated with authorized use of the token is validated in the token, a nonce is generated in the token. The password is passed to the token in a command and the nonce is passed to the client application process in a response to the command. The nonce is used by the client application process or any other additional processes during execution of the user privileged operation. Additional nonces, including those based on security level can be generated and passed to additional client application processes as execution of user privileged operations is requested.

11 Claims, 8 Drawing Sheets

U.S. PATENT DOCUMENTS

| | | |
|---|---|---|
| 5,943,423 A | 8/1999 | Muftic |
| 5,991,411 A | 11/1999 | Kaufman et al. |
| 5,991,882 A | 11/1999 | O'Connell |
| 6,005,942 A | 12/1999 | Chan et al. |
| 6,005,945 A | 12/1999 | Whitehouse |
| 6,011,847 A | 1/2000 | Follendore, III |
| 6,016,476 A | 1/2000 | Maes et al. |
| 6,044,155 A | 3/2000 | Thomlinson et al. |
| 6,072,876 A | 6/2000 | Obata et al. |
| 6,141,420 A | 10/2000 | Vanstone et al. |
| 6,178,507 B1 | 1/2001 | Vanstone |
| 6,179,205 B1 | 1/2001 | Sloan |
| 6,226,744 B1 | 5/2001 | Murphy et al. |
| 6,377,825 B1 | 4/2002 | Kennedy et al. |
| 6,490,680 B1 | 12/2002 | Scheidt et al. |
| 6,502,108 B1 | 12/2002 | Day et al. |
| 6,539,093 B1 | 3/2003 | Asad et al. |
| 6,636,975 B1 | 10/2003 | Khidekel et al. |
| 6,643,701 B1 | 11/2003 | Aziz et al. |
| 6,687,190 B2 | 2/2004 | Momich et al. |
| 6,691,137 B1 | 2/2004 | Kishi |
| 6,698,654 B1 | 3/2004 | Zuppicich |
| 6,734,886 B1 | 5/2004 | Hagan et al. |
| 6,760,752 B1 | 7/2004 | Liu et al. |
| 6,804,687 B2 | 10/2004 | Sampson |
| 6,819,766 B1 | 11/2004 | Weidong |
| 6,826,686 B1 | 11/2004 | Peyravian |
| 6,829,712 B1 | 12/2004 | Madoukh |
| 6,880,037 B2 | 4/2005 | Boyer |
| 6,880,084 B1 | 4/2005 | Brittenham et al. |
| 6,898,605 B2 | 5/2005 | Constantino |
| 6,898,714 B1 | 5/2005 | Nadalin et al. |
| 6,931,133 B2 | 8/2005 | Andrews et al. |
| 6,941,326 B2 | 9/2005 | Kadyk et al. |
| 6,970,970 B2 | 11/2005 | Jung et al. |
| 6,978,933 B2 | 12/2005 | Yap et al. |
| 6,986,040 B1 * | 1/2006 | Kramer et al. .................. 713/155 |
| 7,007,105 B1 | 2/2006 | Sullivan et al. |
| 7,010,600 B1 | 3/2006 | Prasad et al. |
| 7,050,589 B2 | 5/2006 | Kwan |
| 7,051,213 B1 | 5/2006 | Kobayashi et al. |
| 7,085,386 B2 | 8/2006 | Audebert et al. |
| 7,114,028 B1 | 9/2006 | Green et al. |
| 7,156,302 B2 | 1/2007 | Yap et al. |
| 7,159,763 B2 | 1/2007 | Yap et al. |
| 7,185,018 B2 | 2/2007 | Archbold et al. |
| 7,251,728 B2 | 7/2007 | Toh et al. |
| 7,278,581 B2 * | 10/2007 | Ong ................................. 235/492 |
| 7,299,364 B2 * | 11/2007 | Noble et al. .................... 713/189 |
| 7,302,585 B1 | 11/2007 | Proudler et al. |
| 7,356,688 B1 | 4/2008 | Wang |
| 7,374,099 B2 | 5/2008 | de Jong |
| 7,386,705 B2 | 6/2008 | Low et al. |
| 7,437,757 B2 | 10/2008 | Holdsworth |
| 7,451,921 B2 | 11/2008 | Dowling et al. |
| 7,475,250 B2 | 1/2009 | Aull et al. |
| 7,475,256 B2 | 1/2009 | Cook |
| 7,480,384 B2 | 1/2009 | Peyravian et al. |
| 7,502,793 B2 | 3/2009 | Snible et al. |
| 7,571,321 B2 | 8/2009 | Appenzeller et al. |
| 7,602,910 B2 | 10/2009 | Johansson et al. |
| 7,702,917 B2 | 4/2010 | Tevosyan et al. |
| 7,769,996 B2 | 8/2010 | Randle et al. |
| 7,822,209 B2 | 10/2010 | Fu et al. |
| 7,860,243 B2 | 12/2010 | Zheng et al. |
| 2001/0008012 A1 | 7/2001 | Kausik |
| 2001/0036276 A1 | 11/2001 | Ober et al. |
| 2001/0054148 A1 | 12/2001 | Hoornaert et al. |
| 2002/0004816 A1 | 1/2002 | Vange et al. |
| 2002/0007351 A1 | 1/2002 | Hillegass et al. |
| 2002/0007359 A1 | 1/2002 | Nguyen |
| 2002/0010679 A1 | 1/2002 | Felsher |
| 2002/0029343 A1 | 3/2002 | Kurita |
| 2002/0056044 A1 | 5/2002 | Andersson |
| 2002/0059144 A1 | 5/2002 | Meffert et al. |
| 2002/0064095 A1 | 5/2002 | Momich et al. |
| 2002/0080958 A1 | 6/2002 | Ober et al. |
| 2002/0099727 A1 | 7/2002 | Kadyk et al. |
| 2002/0112156 A1 | 8/2002 | Gien et al. |
| 2002/0120842 A1 | 8/2002 | Bragstad et al. |
| 2002/0133707 A1 | 9/2002 | Newcombe |
| 2002/0171546 A1 | 11/2002 | Evans et al. |
| 2002/0184149 A1 | 12/2002 | Jones |
| 2002/0188848 A1 | 12/2002 | Buttiker |
| 2003/0005291 A1 | 1/2003 | Burn |
| 2003/0012386 A1 | 1/2003 | Kim et al. |
| 2003/0028664 A1 | 2/2003 | Tan et al. |
| 2003/0035548 A1 | 2/2003 | Kwan |
| 2003/0056099 A1 | 3/2003 | Asanoma et al. |
| 2003/0075610 A1 * | 4/2003 | Ong ................................. 235/492 |
| 2003/0093695 A1 | 5/2003 | Dutta |
| 2003/0115455 A1 | 6/2003 | Aull et al. |
| 2003/0115466 A1 | 6/2003 | Aull et al. |
| 2003/0115467 A1 | 6/2003 | Aull et al. |
| 2003/0115468 A1 | 6/2003 | Aull et al. |
| 2003/0167399 A1 | 9/2003 | Audebert et al. |
| 2003/0172034 A1 | 9/2003 | Schneck et al. |
| 2004/0042620 A1 | 3/2004 | Andrews et al. |
| 2004/0053642 A1 | 3/2004 | Sandberg et al. |
| 2004/0066274 A1 | 4/2004 | Bailey |
| 2004/0088562 A1 * | 5/2004 | Vassilev et al. ................ 713/200 |
| 2004/0096055 A1 | 5/2004 | Williams et al. |
| 2004/0103324 A1 | 5/2004 | Band |
| 2004/0103325 A1 | 5/2004 | Priebatsch |
| 2004/0120525 A1 | 6/2004 | Miskimmin et al. |
| 2004/0144840 A1 | 7/2004 | Lee et al. |
| 2004/0146163 A1 | 7/2004 | Asokan et al. |
| 2004/0153451 A1 | 8/2004 | Phillips et al. |
| 2004/0162786 A1 | 8/2004 | Cross et al. |
| 2004/0230831 A1 | 11/2004 | Spelman et al. |
| 2005/0022123 A1 | 1/2005 | Constantino |
| 2005/0033703 A1 | 2/2005 | Holdsworth |
| 2005/0109841 A1 | 5/2005 | Ryan et al. |
| 2005/0114673 A1 | 5/2005 | Raikar et al. |
| 2005/0119978 A1 | 6/2005 | Ates |
| 2005/0123142 A1 | 6/2005 | Freeman et al. |
| 2005/0138386 A1 | 6/2005 | Le Saint |
| 2005/0138390 A1 | 6/2005 | Adams et al. |
| 2005/0144312 A1 | 6/2005 | Kadyk et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0216732 A1 | 9/2005 | Kipnis et al. |
| 2005/0262361 A1 | 11/2005 | Thibadeau |
| 2005/0279827 A1 | 12/2005 | Mascavage et al. |
| 2005/0289652 A1 | 12/2005 | Sharma et al. |
| 2006/0005028 A1 | 1/2006 | Labaton |
| 2006/0010325 A1 * | 1/2006 | Liu et al. ........................ 713/173 |
| 2006/0015933 A1 | 1/2006 | Ballinger et al. |
| 2006/0036868 A1 | 2/2006 | Cicchitto |
| 2006/0043164 A1 * | 3/2006 | Dowling et al. ................ 235/375 |
| 2006/0072747 A1 | 4/2006 | Wood et al. |
| 2006/0073812 A1 | 4/2006 | Punaganti Venkata et al. |
| 2006/0075133 A1 | 4/2006 | Kakivaya et al. |
| 2006/0075486 A1 | 4/2006 | Lin et al. |
| 2006/0101111 A1 | 5/2006 | Bouse et al. |
| 2006/0101506 A1 | 5/2006 | Gallo et al. |
| 2006/0173848 A1 | 8/2006 | Peterson et al. |
| 2006/0174104 A1 | 8/2006 | Crichton et al. |
| 2006/0206932 A1 | 9/2006 | Chong |
| 2006/0208066 A1 | 9/2006 | Finn et al. |
| 2006/0226243 A1 | 10/2006 | Dariel |
| 2006/0291664 A1 | 12/2006 | Suarez et al. |
| 2006/0294583 A1 | 12/2006 | Cowburn et al. |
| 2007/0014416 A1 | 1/2007 | Rivera et al. |
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 * | 5/2007 | Buer .................................. 726/8 |
| 2007/0162967 A1 | 7/2007 | de Jong et al. |
| 2007/0169084 A1 | 7/2007 | Frank et al. |
| 2007/0189534 A1 | 8/2007 | Wood et al. |
| 2007/0204333 A1 | 8/2007 | Lear et al. |
| 2007/0230706 A1 | 10/2007 | Youn |
| 2007/0271601 A1 | 11/2007 | Pomerantz |

| | | |
|---|---|---|
| 2007/0277032 A1 | 11/2007 | Relyea |
| 2007/0280483 A1 | 12/2007 | Fu |
| 2007/0282881 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1* | 5/2009 | Thoursie .......................... 726/6 |
| 2010/0313027 A1 | 12/2010 | Taylor |

FOREIGN PATENT DOCUMENTS

| | | |
|---|---|---|
| WO | 0048064 A1 | 8/2000 |
| WO | 2007096590 A1 | 8/2007 |

OTHER PUBLICATIONS

AMD Announces Specification for Open Platform Management Architecture, Feb. 28, 2005, pp. 1-2 http://www.thefreelibrary.com/AMD+Announces+Specification+for+Open+Platform+Management+Architecture—a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Secure Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS# v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

Schneier, Bruce. Applied Cryptography, Second Edition. 1996 John Wiley and Sons, pp. 480-481.

* cited by examiner

METHODS AND SYSTEMS FOR NONCE GENERATION IN A TOKEN

FIELD OF THE INVENTION

The present invention relates generally to security in connection with token based access to multi-user processing environments and more particularly, to providing a nonce to prevent unauthorized access to information stored in a token.

BACKGROUND OF THE INVENTION

As computer systems and associated networks become more ubiquitous and complex; as the sensitivity of the content of the systems and network increases, and as the conventional user access paradigms changes for organizations of all types and sizes, from main offices or workplaces having dedicated IT systems to decentralized networks of IT servers and the like, system security rapidly becomes a major concern. Where secure access is required for individuals in a multi-user environment, security and identify verification and management become more important in maintaining system and network security and data integrity.

The use of tokens, such as universal serial bus (USB) tokens, smartcards or the like is gaining popularity as a way of providing flexible access to system resources from a variety of locations. A token is generally accepted as an integral part of a two-factor security paradigm involving possession of the token as the first factor and authentication of the holder of the token as the second factor. A token allows information specific to a user to be stored in the token and used to authenticate a user and subsequently provide access to system resources. A typical token is provided with a memory and a processor, microcontroller, or the like for executing applications for managing card security, providing access to information on the card and the like.

Problems can arise despite system security measures, since secure access to information stored on the token can be compromised from time to time by processes running in the multi-user processing environment including unauthorized or malicious processes, which can gain access to the card once the card is legitimately opened for access by the normal authentication process. Further, preventing access altogether is not feasible since some access may be required by an entity or entities other than the authorized user. Such access may be security level specific.

Therefore it would be desirable for a solution to the problem of controlling or restricting access to token information by other than the authorized user. In addition, factors such as scalability, standards compliance, regulatory compliance, security administration and the like must also be taken into consideration.

While a general background including problems in the art are described hereinabove, with occasional reference to related art or general concepts associated with the present invention, the above description is not intended to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide methods and systems for resetting a password in a token using an authentication credential provided by a third party. In accordance with one or more embodiments, an exemplary method provides a nonce during a login associated with a token in a multi-user computer system, which nominally includes a client. The method includes activating a login process by inserting the token into a token interface. A password is then provided by an access requester associated with authorized use of the token during operation of the login process and validated. The login can be performed in accordance with a number of standards such as username and password using Digest message digest 5 (MD5), operating system (OS) based login using pluggable authentication modules (PAM)/network information service (NIS), Kerberos simple authentication security layer (SASL)/generic security service application program interface (GSSAPI) based login, public key infrastructure (PKI) based authentication based on certificates specified, for example, in the X.509 standard, or the like.

A nonce is generated in the token after successfully validating the password. It will be appreciated that the nonce is provided to the client application process and used during any request for access to information in the token. In other embodiments, the nonce can be provided to one or more of a plurality of application processes associated with the client. The nonce can then used by the application processes or APIs associated with the application processes during any request for execution of a user privileged operation using, for example, commands associated with ISO 7816. It will be appreciated that the verification of the password and nonce and the like can be accomplished in accordance with various methods. In still other embodiments, a plurality of different nonces can be provided to a corresponding plurality of application processes. The plurality of different nonces are then used by the one or more of the plurality of application processes during requests for access to the information in the token. In some cases, the plurality of different nonces are each allocated to the plurality of application processes based on different security levels.

As noted, the nonces are used in user privileged operations which can include access to a resource associated with the multi-user computer system, access to a user privileged data object in the token for operations such as creation, modification, reading, writing, and deletion of the data object, and logout. Alternatively, in accordance with some standards, such as ISO 7816, the nonce and other security information will be used in each specific user privileged operation. Therefore, an application process not using the nonce with a command associated with a user privileged operation will fail in the request since the decryption will be unsuccessful. To further enhance security, the nonce is stored in a volatile memory associated with the token such that when the token is removed from the token interface, the nonce is lost. It will be appreciated by those of skill in the art that various embodiments of the present method can take various forms. The method can be embodied, for example, in an apparatus configured to perform the method, in a computer readable medium containing computer executable instructions for performing the method, and the like.

In still other embodiments, the present invention can include a client in a token-access multi-user computer system. The computer system can be configured to provide access to information on a secure basis to authorized requesters associated with a token. The token can have a memory including a volatile memory area and to accommodate the token, the computer system can include a token interface. The client can include a client processor, which activates a login process when insertion of the token in the token interface is detected. The client processor can collect a password during the login process. The password is provided by an access requester associated with authorized use of the token. The client processor then receives a nonce from the token after the password is successfully validated. The nonce is displayed, for example through a user interface, in the login process. The nonce is entered by the access requester at which point the nonce can be used by a client application process during any request for access to information in the token, which request can include a request to decrypt information. Alternatively, the nonce or a plurality of nonces can be provided to any one or more of a plurality of trusted APIs registering with the client, whereupon the nonce is used by the APIs during any request for access to the information in the token. The nonces can be allocated to the plurality of trusted APIs based on different security levels. It will be appreciated that the client processor can be configured to store the nonce in the volatile memory area associated with the token such that when the token is removed the nonce is lost.

In still other embodiments, the present invention includes a token for insertion into a multi-user computer system. The token can interface with a client application process and includes a memory having a volatile memory area. The token further includes a processor coupled to the memory and configured, for example, through operation of one or more programs or processes, to activate an interface process when the token is inserted into the multi-user computer system. The interface process validates a password received from the client application process. Upon validation of the password, a nonce generation process can be activated to generate a nonce and return the nonce to the client application process. The nonce can be stored in the volatile memory area of the memory. Alternatively, the processor is further configured to generate a plurality of different nonces in the nonce generation process. Each of the plurality of different nonces can be returned to respective ones of different client APIs. The different nonces can be generated based on different security levels and returned to respective ones of the client APIs based on respective security levels associated therewith. When the nonce or nonces have been generated and returned, a request for access to information stored on the token can be processed by comparing a value associated with the request with the nonce and granting access to the information if the comparison is successful. It will be appreciated that the nonce generation process can be associated with and compliant with a standard. As further discussed herein below, various inventive principles and combinations thereof are advantageously employed to securely access data associated with a smart card or token.

It should be noted that the term password is used extensively herein to denote a value or string entered by a user for purpose of authenticating the user as an authorized user of, in this case, the token. Thus it will be understood that in accordance with different embodiments various phrases may be interchangeable with the term password, such as personal identification numbers or PINs, or the like and that the password can be associated with other security values and parameters such as certificates, public keys, cryptographic token interface data, and other standards related information such as information encrypted according to public key cryptography standard # 11 (PKCS 11), identifiers, and related data. Such information can be stored, for example, on the token. Further, reference will be made to execution or requests for execution of user privileged operations by application processes or other software processes or the like to applications, information stored on the token, or the like. Such user privileged access can be made according to standard access functions as specified for example, in international standards organization (ISO) standard number 7816, part 4 "Interindustry Commands for Interchange," section 5 "APDU Commands." In particular, section 5.3 is of particular interest to nonce generation and use in accordance with the present invention. While ISO 7816, part 4, section 5.3 is useful in defining generic commands and responses associated with the application protocol data unit (APDU) commands and responses, it will be appreciated that other command structures and responses and other mechanisms can also be used to implement the use of a nonce in executing user privileged operations.

Reference will now be made in detail to the accompanying drawings. Wherever possible, the same reference numbers will be used throughout the drawings to refer to the same or like parts.

Figure 1:
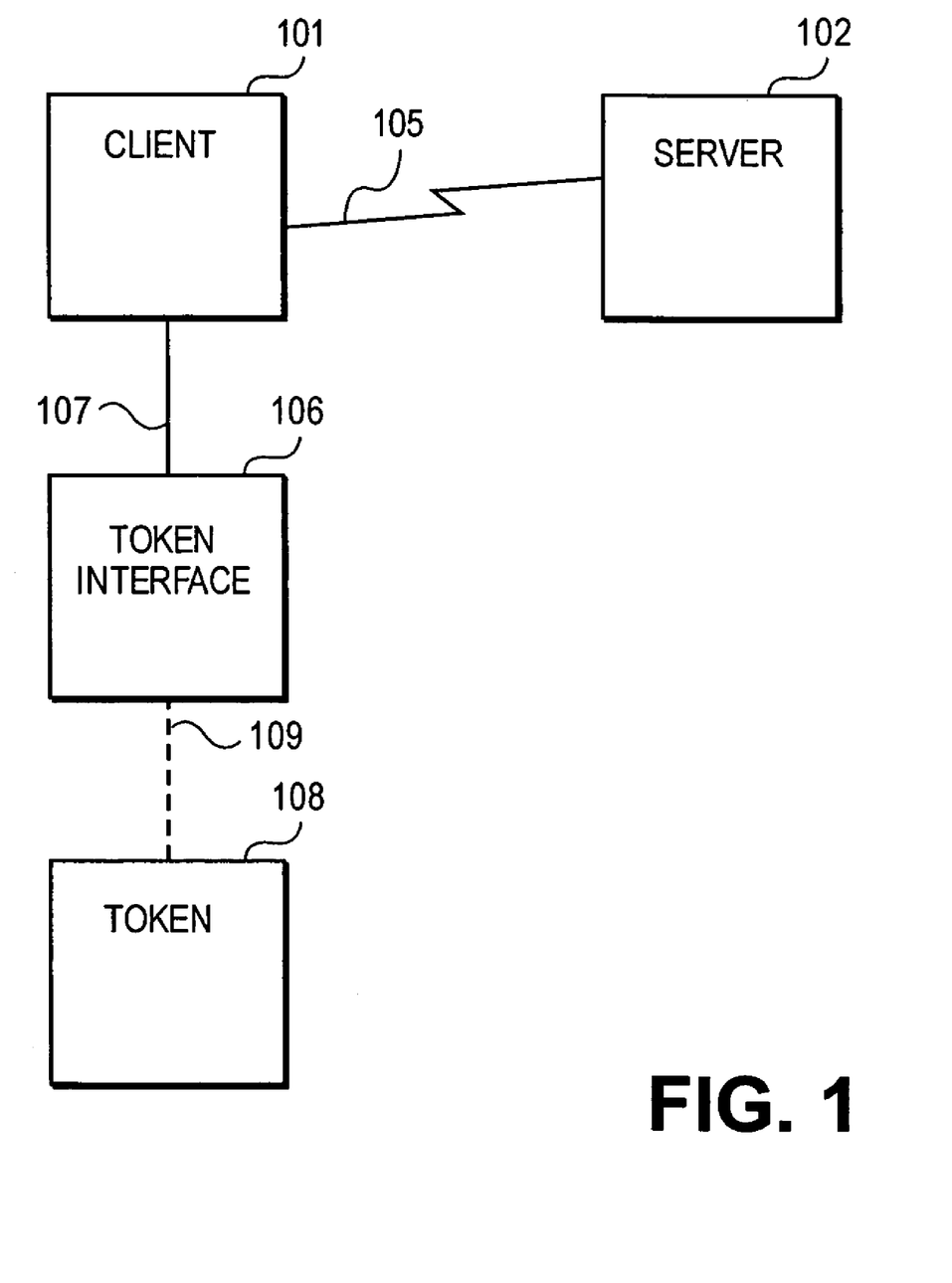
FIG. 1 is a diagram illustrating exemplary components of a computer system consistent with embodiments of the present invention.

Referring now to FIG. 1, a simplified and representative environment associated with a computer system will be discussed and described. The environment includes a client 101, a token 108, and a server 102. The server 102 and client 101 are connected via a connection 105 which can be a direct connection such as a wired or wireless connection or can be an indirect connection such as a connection through the internet, private network or the like. It will also be appreciated that in some instances, the server 102 and client 101 can exist within the same computer and therefore can be connected with a data bus or high speed serial connection or the like. The server 102 naturally has access to information stored locally at the server 102, and also can access information stored remotely in various external data systems (not shown) provided a proper interface exists to the external data systems. It will be appreciated that the server 102 may be a general purpose computer or dedicated computing platform configured to execute secure and/or unsecure (or open) applications through a multiple user operating system (not shown). While many operations are performed in connection with the client 101, the server 102 can operate independently for certain procedures. The server 107 may be implemented with general purpose server platforms as known to those skilled in the art from Intel, Advanced Micro Devices, Hewlett-Packard, and/ or others or can be implemented with other custom configured server architectures. The server 102 may interact with the client 101 over the connection 105, which can include, for example, a communication network. The connection 105 provides a communication channel for the server 102 and the client 101 to exchange data and commands, as well as for the server 102 to interface to the token 103.

The client 101 can include a general purpose computer or dedicated computing platform configured to execute secure and/or open applications through the multi-user operating system of server 102 or can operate through an independent operating system or independent version of the operating system of server 102. The client 101 can include a personal computer, a workstation, a thin client, a thick client, or other similar computing platform. It will be appreciated that thin client means a computer or client in a client-server architecture having little or no application logic and therefore having a small boot image. A thin client depends primarily on the central server, such as server 102, for processing activities. Therefore client 101, when operating as a thin client has no more software than is required to connect to server 102, perform a login procedure, generate a nonce and the like.

It can further be seen that client 101 is configured to interface with the token 108 through a token interface 106 connected through a link 107. The token 108 is connected to token interface 106 through connection 109 which can be a universal serial bus (USB) connection, an edge connector, or some other type of connection for a token interface as would be appreciated. The client 101, the token 108 and the server 102 can be configured in accordance with known techniques so that the server 102 can connect to the token 108 transparently through the client 101. In accordance with known techniques, the connection 105 can be a secure connection however, additional secure channels can be established separately to connect the server 102 and the token 108, for example for mutual authentication prior to conducting card management functions. It should be noted however, that for operation in accordance with the present invention, there is little or no interaction with the server.

Figure 2:
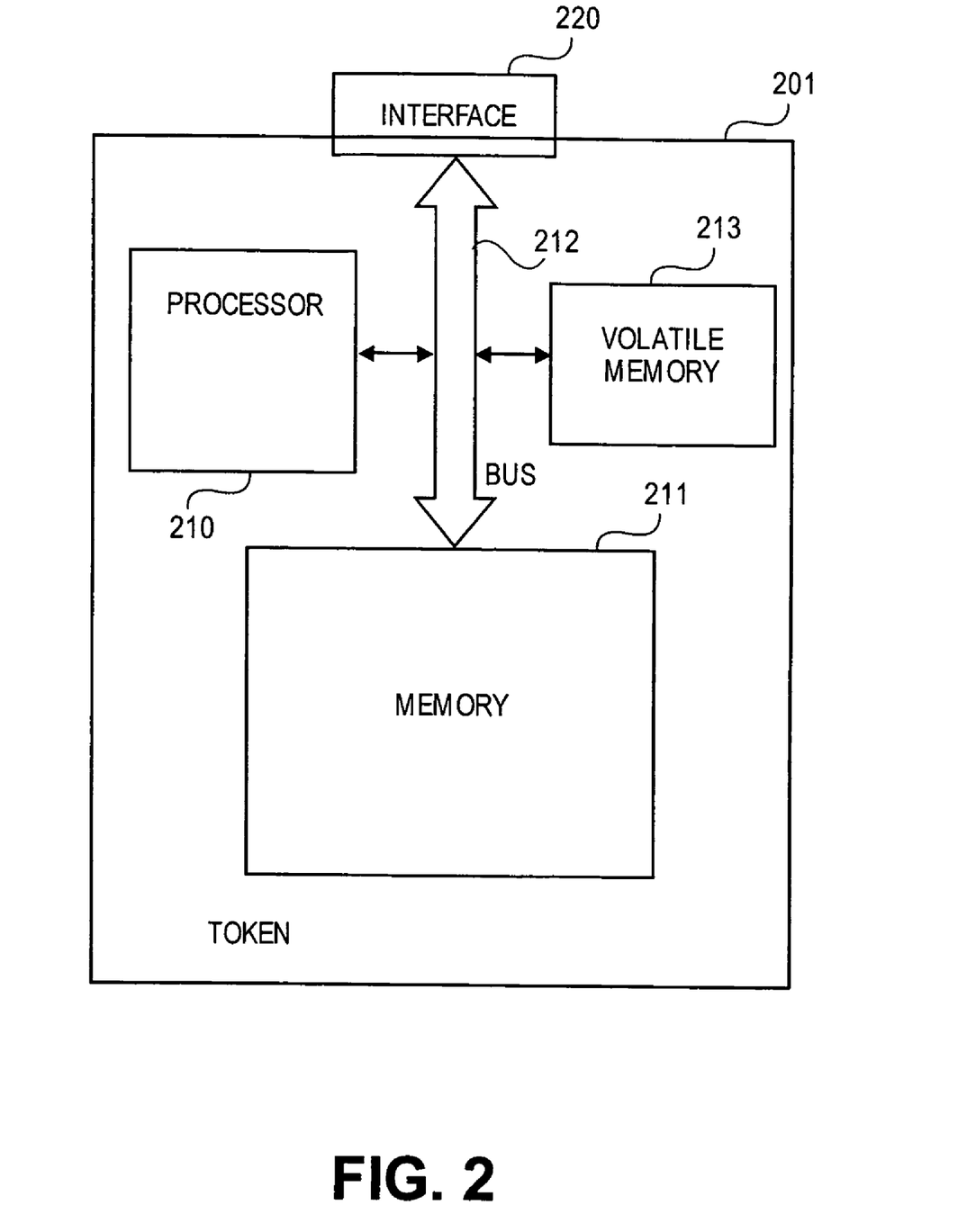
FIG. 2 is a diagram illustrating an exemplary token having a processor a memory and an interface consistent with operation in accordance with the present invention.

To better understand a typical token 108 in accordance with the invention, FIG. 2 illustrates an exemplary token 201 having a processor 210, a memory 211, a volatile memory 213, an interface 220, and a bus 212 or other connection interconnecting the elements. The token 201 is an integral part of any two factor authentication system where the token 201 represents a first posessory factor in the security model, in other words possession of the token 201 assumes that the holder of the token 201 is the authorized user. The password or PIN represents the second factor in the two factor security model and in connection with the first factor, the possession of the token 201, completes the security model.

It will be appreciated that the processor 210 can be one of a variety of different processors including general purpose processors, custom processors, controllers, compact eight-bit processors or the like, however, processor 210 must be able to execute applications for generating nonces or the like in accordance with the invention. The memory 211 can also be one or a combination of a variety of types of memory such as random access memory (RAM), read only memory (ROM), flash memory, dynamic RAM (DRAM) or the like. The memory 211 can further include a volatile memory area, or a volatile memory 213 can be provided which will be erased when power is removed from the token 201. It will also be appreciated that in most instances, the token 201 will derive power from the interface 220, that is, will derive power from the host device such as a token interface unit. The interface unit provides power as part of an interface standard. For example, the USB standard calls for pins 1 and 4 to provide Vcc and GND, with Vcc being around 5 volts DC. It should be noted that in some tokens, additional features are present for additional security factors such as biometrics or the like.

Figure 3:
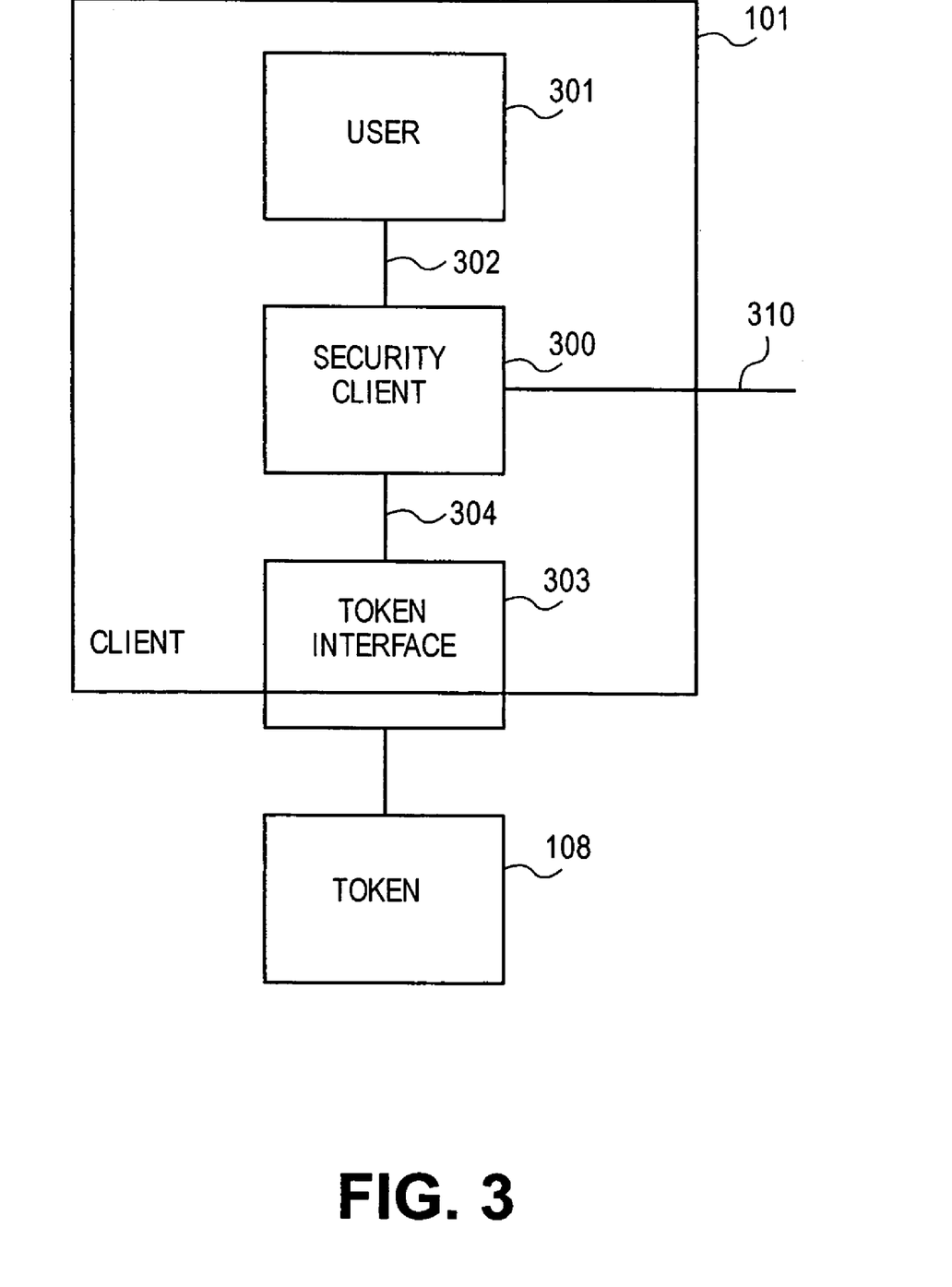
FIG. 3 is a diagram illustrating processes associated with an exemplary client in accordance with embodiments of the present invention.

A typical client 101 is further illustrated in FIG. 3. Client 101 can include a security client 300, which can be a software program or process executing on the client 101. The client 101 can also include a token interface 303, which can include all or portion of an independent token interface such as token interface 106 illustrated in FIG. 1, and/or an interface integral to the token such as interface 220 illustrated in FIG. 2. The client 101 can also include a hardware interface, a software interface or a combination thereof, such as a USB connector circuit and USB software driver. The client 101 further includes a user 301, which can be a user process or user agent such as an application program possibly including an application program interface (API), the application process for providing a dialog to a requester for inputting information into the client 101 such as a password or the like. In addition to a password, the client 101, and specifically the application process can receive a nonce generated by the token 108 in an APDU response to an APDU command sent to the token with the password. The nonce will used for user privileged operations as will be described in greater detail hereinafter.

The client 101 can also include a connection 310 for connecting to a server such as server 102 described in connection with FIG. 1. The connection 310 can be used by the client 101 to connect with the server 102 for card management purposes and the like. However, it should be note that in accordance with the present invention interaction with the server is not required for nonce use.

Figure 4A:
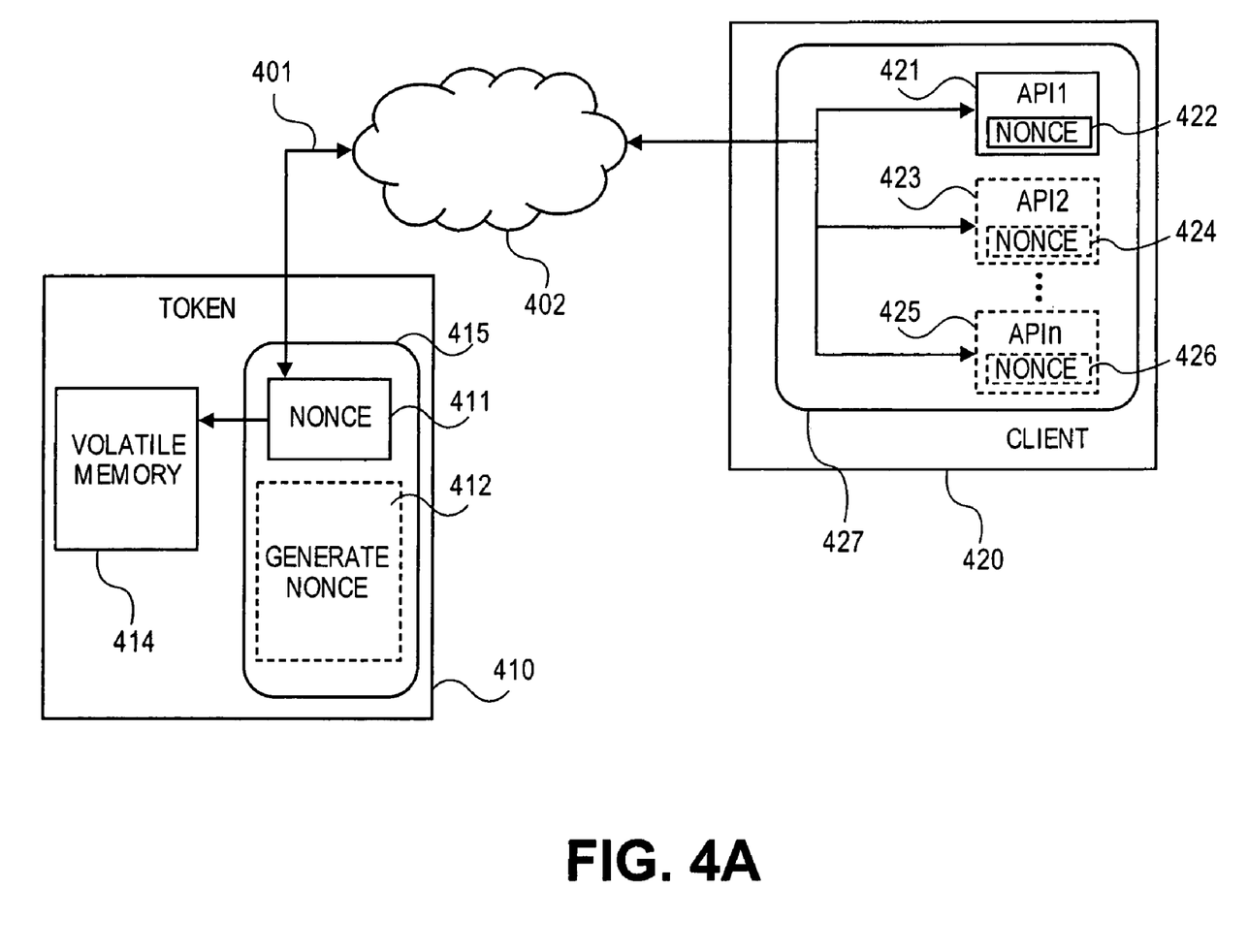
FIG. 4A is a diagram illustrating components of a nonce provisioning and use scenario between a token and application program interfaces (APIs) in accordance with the present invention.

An exemplary scenario for nonce generation and use is shown in FIG. 4A. A token 410 can be a token described in connection with FIG. 1 and FIG. 2, or any other token capable of storage including volatile storage and configured for processing requests for execution of user privileged operations associated with accessing resources associated with the computer system, accessing data objects stored in the token including conducting such operations as reading, writing, creating, deleting, modifying, importing, and the like associated with the data object or objects, logging in and out of the computer system and/or token and the like.

Accordingly, the token 410 can, as described in connection with FIG. 2, have a processor 210 for execution of processes, programs, applets and the like as would be appreciated. The token-based process 415 can be used to process the generation of nonces in accordance with the invention. The token 410 can be connected to a client 420, which can be executing a client application process 425 or several application processes as will be appreciated. The token 410 and the client 420 can be connected in a number of ways through a link 401 through some sort of medium 402, which can include a token interface and a physical medium for connecting to the client 420, the physical medium including a wired or wireless medium, a network fabric, or the like as will be appreciated. Once the connection is made, for example, by insertion of the token 410 or the like, the token based process 415 can be activated to perform processing of token commands such as ISO 7816 commands under part 4, section 5.3, which include APDU commands and responses. The token based process 415 will await such commands and process them as described herein.

Meanwhile in the client 420, a request for execution of a user privileged operation, for example as described above, can be made and is conducted generally in the context of an application program interface (API) such as API1 421, API2 423 and APIn 425. The request could include a call to an email application, a call to view a sensitive web site, a call to operate on a data object stored on the token 410 or the like. The request by the client application process 425 for execution of a user privileged operation will activate a login process, which can include providing a dialog on a display associated with a user (not shown).

In response to the dialog, the user may enter the password, PIN, or the like, in connection with any number of well known authentication mechanisms. The entry of the password will generate a command from the requesting application process or API to the token 410 including the password for validation by the token 410. If the password is validated, the token based process 415 will generate a nonce 411 in process 412 which can be a process, method, function, algorithm or the like. It will be appreciated that a nonce can be any type of value having time limited significance such as a random number. The command generated by the application process will be of a format, such as an APDU command format in accordance with ISO 7816, part 4, section 5.3, that expects a response, such as an APDU response.

Upon validation of the password sent with the command, the response will be generated by the token to include the nonce 411. The nonce 411 is stored in volatile memory 414 and can be passed to the client application process 425 as a data parameter in the response to the command. The response will simultaneously indicate to the client application process 425 that the password is validated and provide the nonce 411. In particular, the nonce 411 is provided to the requesting one of API1 421, API2 423 and APIn 425. The respective one of API1 421, API2 423 and APIn 425 will use the nonce in respective fields 422, 424 and 426 in connection with the user privileged operation. If the user privileged operation involves access to a key stored on the token 410, the nonce will be stripped from the request or operation and the request or operation will be processed in the normal manner if the nonce is verified. If the nonce is not verified, then the request or operation will fail.

Figure 4B:
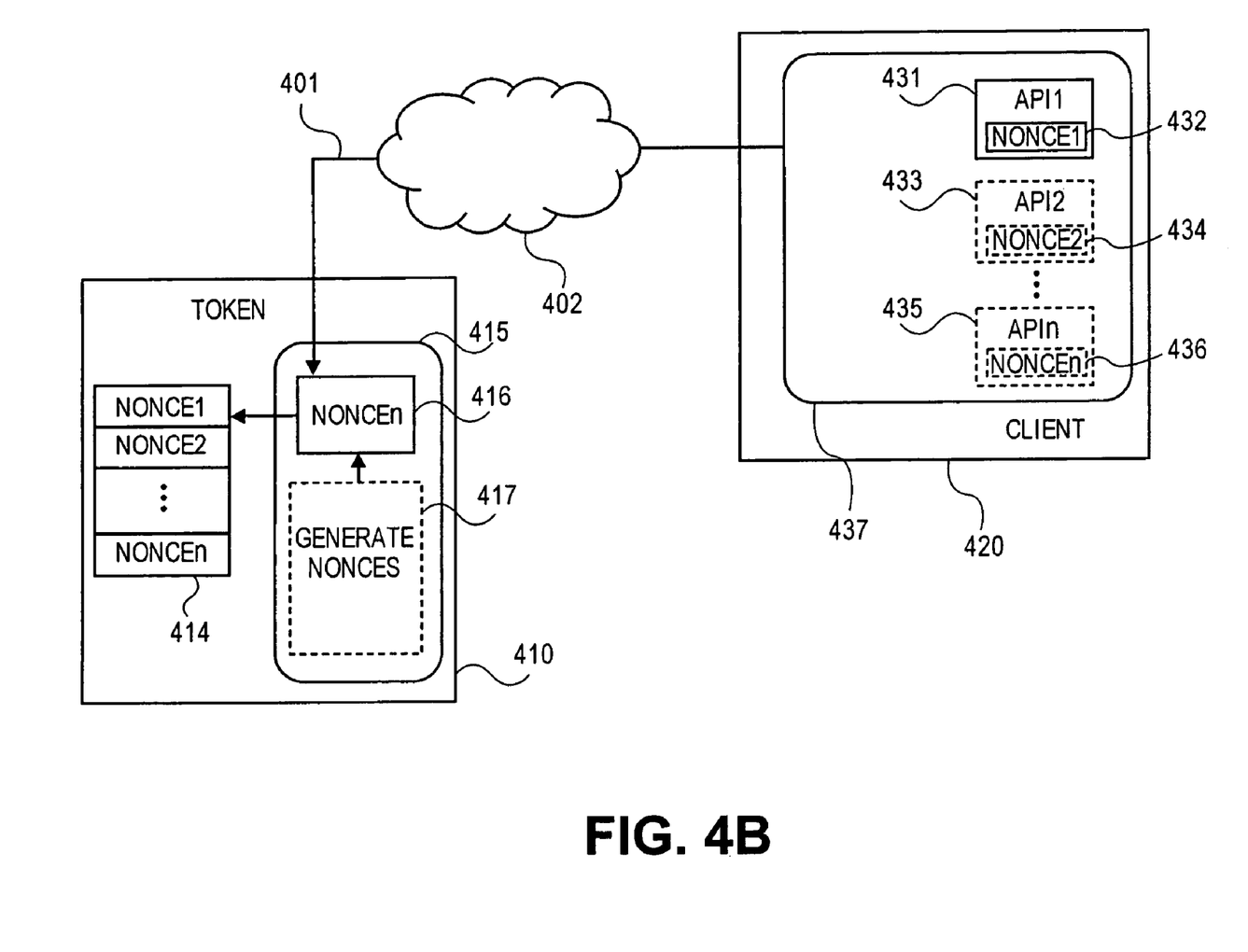
FIG. 4B is a diagram illustrating components of a multiple nonce provisioning and use scenario between a token and application program interfaces (APIs) in accordance with the present invention.

In a similar manner, as shown in FIG. 4B, the token based process 415 can generate a series of nonces in process 417 and provide them individually such as a nonce n 416 to the requesting one of API1 431, API2 433 and APIn 435 associated with client application process 437 executing in client 420. Based on a request by one of API1 431, API2 433 and APIn 435 for execution of a user privileged operation including a call to an email application, a call to view a sensitive web site, a call to operate on a data object stored on the token 410 or the like, the nonce n 416 can be generated.

The request by an API associated with client application process 437 for execution of a user privileged operation, will activate a login process, which, as described, can include providing a dialog on a display associated with a user (not shown). The user may enter the password, PIN, or the like, in connection with any number of well known authentication mechanisms. The entry of the password will generate a command from the requesting API to the token 410 including the password for validation by the token 410. If the password is validated, the token based process 415 will generate a nonce 416 in process 417. As described above, the nonce can be any type of value having time limited significance such as a random number.

As noted above, the command generated by the application process will be of a format, such as an APDU command format in accordance with ISO 7816, part 4, section 5.3, that expects a response, such as an APDU response. The response will be generated by the token to include the nonce 416. The nonce 416 as well as other generated nonces is stored in volatile memory 414 and can be passed to the client application process 425 as a data parameter in the response to the command. The response will simultaneously indicate to the client application process 425 that the password is validated and provide the nonce 416. In particular, the nonce 416 is provided to the requesting one of API1 431, API2, 433 and APIn 435. The respective one of API1 431, API2 433 and APIn 435 will use different nonces such as a nonce 1, nonce 2 and nonce n, in respective fields 432, 434 and 436 in connection with the user privileged operation.

It will be appreciated that if the user privileged operation or request for the operation involves access to a data object such as a key stored on the token 410, the nonce will be stripped from the request or operation and the request or operation will be process in the normal manner if the nonce is verified. If the nonce is not verified, then the request or operation will fail. Some or all of the APIs can be provided with a different nonce. Further, in accordance with some embodiments, different nonces can be provided based on user role, security level, access privilege level or the like.

Figure 5A:
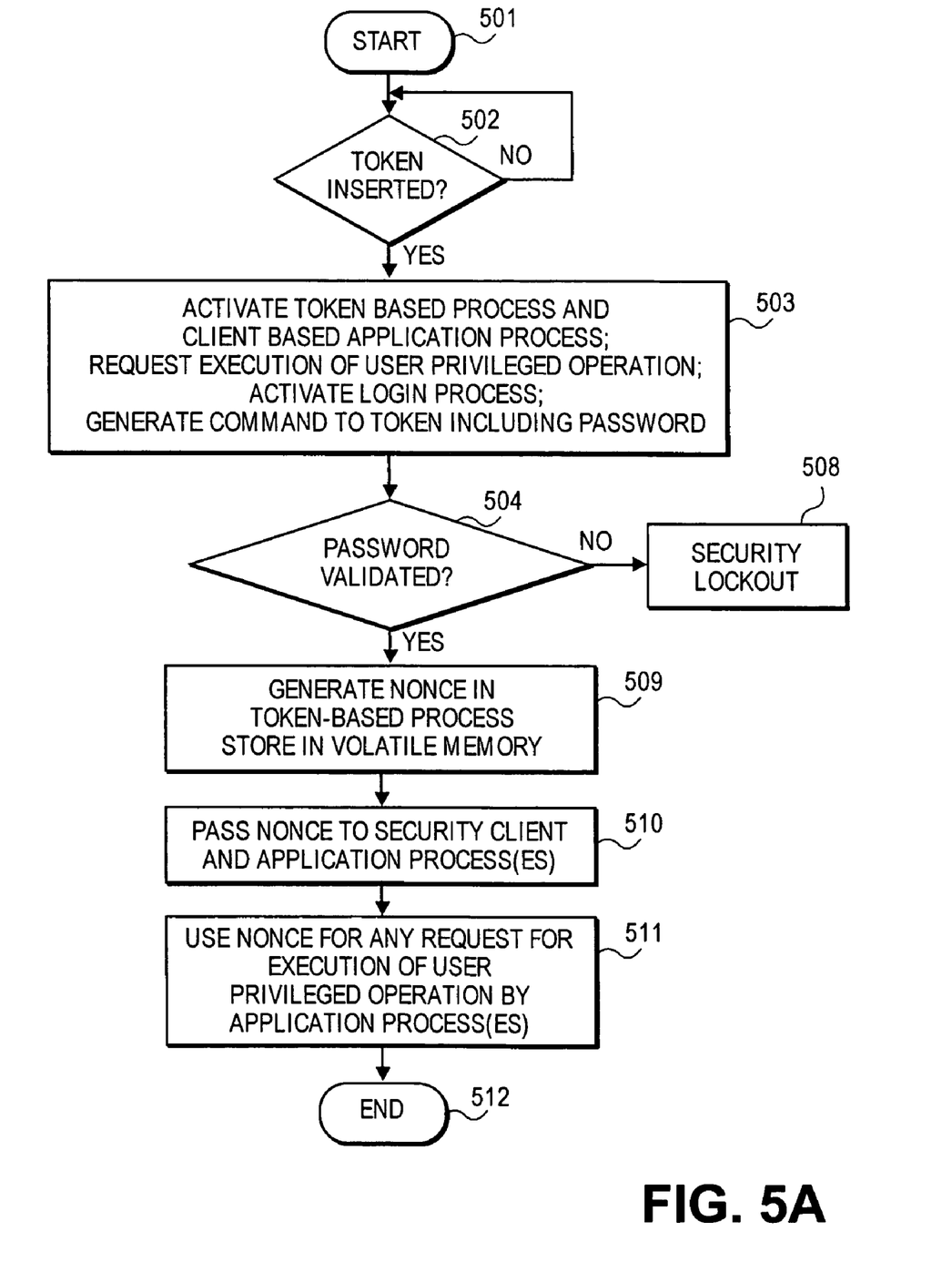
FIG. 5A is a flow chart illustrating an exemplary procedure for nonce generation in accordance with the present invention.
Figure 5B:
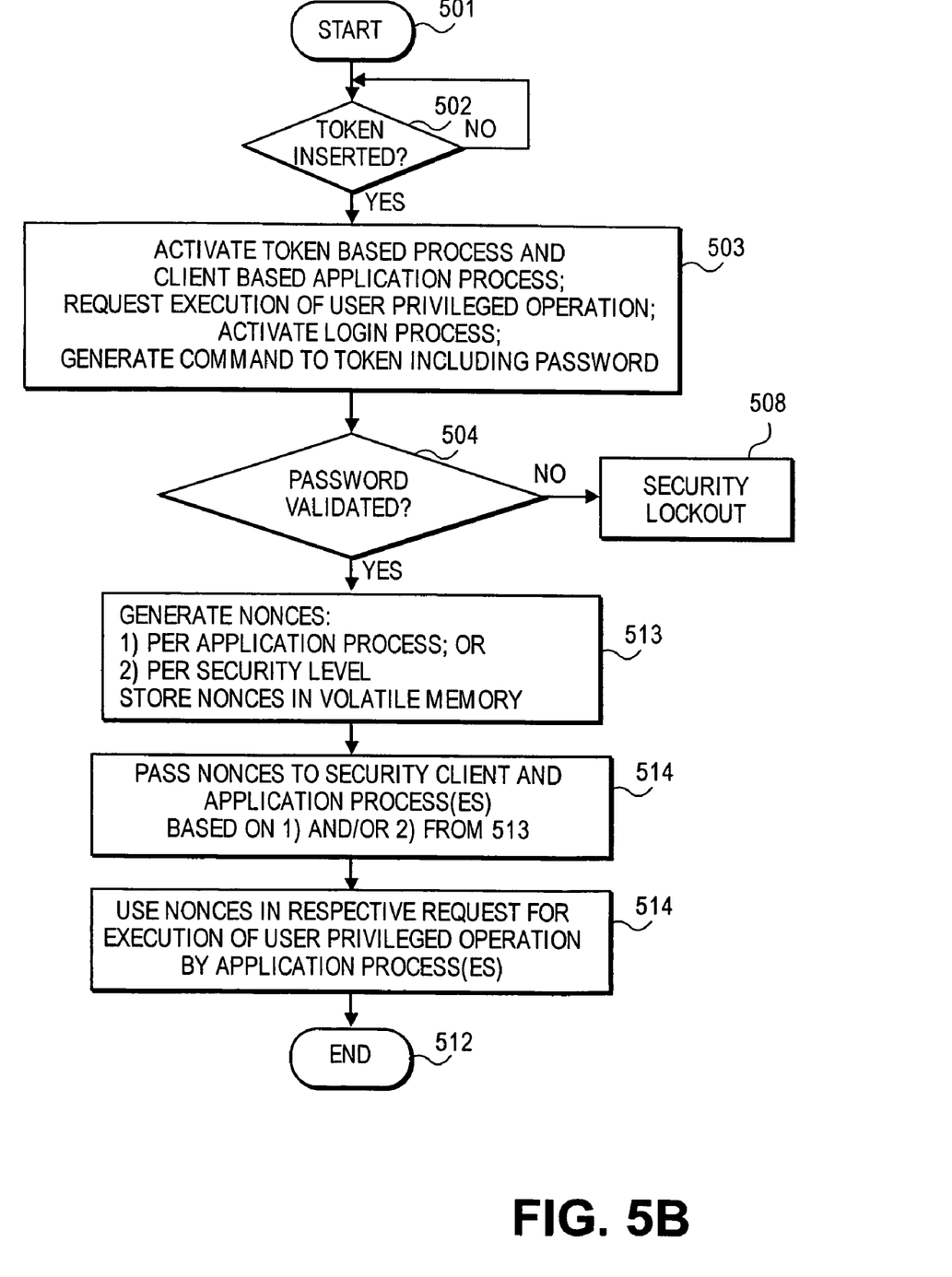
FIG. 5B is a flow chart illustrating an exemplary procedure for multiple nonce generation in accordance with the present invention.

FIG. 5A and FIG. 5B illustrate method for nonce generation. FIG. 5A illustrates generation of a single nonce, while FIG. 5B illustrates generation of a multiple nonces. Accordingly, an exemplary procedure or method for nonce generation in accordance with the invention is shown in FIG. 5A. After start in 501, a determination can be made if the token is inserted in 502. It will be appreciated that without the token insertion, any execution of user privileged operations will not be possible. Therefore, the procedure will loop until a token is inserted. Meanwhile, in 503, a token based process can be activated to handle requests., commands, and the like for user privileged operations requiring keys stored on the token. A client based application process can be activated and can, through operation thereof request execution of a user privileged operation as described above. The request will generate a login process which will collect a password from, for example, a user, and generate a command to the token including the password requesting validation or the like.

If the password cannot be validated in 504, for example, after a predetermined number of attempts, a security lockout procedure can be activated in 508, which will prevent any further attempts, and in some cases can destroy the keys stored on the token.

If the password is validated in the token, then a nonce can be generated in 509 in the token and stored in volatile memory so that when the token is removed the nonce is lost. The nonce can be passed to the client application process in 510, in a response to the command generated in 503. The nonce can subsequently be used in 511 by any application process, including an API or the like to execute a user privileged operation as described above. While the method is indicated as ending in 512, it will be appreciated that the process can be repeated, for example, if the token is removed and reinserted or removed and inserted elsewhere or if an additional API requires execution of another user privileged operation or the like.

In FIG. 5B an exemplary method or procedure is shown for generating multiple nonces. After start in 501, a determination can be made if the token is inserted in 502. As noted above, without the token insertion, any execution of user privileged operations will not be possible and the procedure will loop until a token is inserted. Meanwhile, in 503, a token based process can be activated to handle requests., commands, and the like for user privileged operations requiring keys stored on the token. A client based application process can be activated and can, through operation thereof request execution of a user privileged operation as described above. The request will generate a login process which will collect a password or the like from, for example, a user, and generate a command to the token including the password requesting validation or the like. If the password cannot be validated in 504, for example, after a predetermined number of attempts, a security lockout procedure can be activated in 508, which will prevent any further attempts, and in some cases can destroy the keys stored on the token. If the password is validated in the token, then different nonces can be generated in 513 in the token and stored in volatile memory so that when the token is removed the nonce is lost. It will be appreciated that the nonces can be generated on a per application process or API basis, meaning that different nonces are generated for each individual application process or API or for specific groups or types of application processes or APIs. Alternatively, or in addition, different nonces can be generated based on security levels. Nonce generation can be accomplished using known techniques such as random number generation or the like. In 514, the different nonces can be passed to the client application processes or APIs based on security level or on a per application process basis, in a response to the command generated in 503. The nonces can subsequently be used in 515 by respective application processes, including APIs or the like to execute a corresponding user privileged operation as described above. While the method is indicated as ending in 512, it will be appreciated that the process can be repeated, for example, if the token is removed and reinserted or removed and inserted elsewhere or if an additional API requires execution of another user privileged operation or the like.

Figure 6:
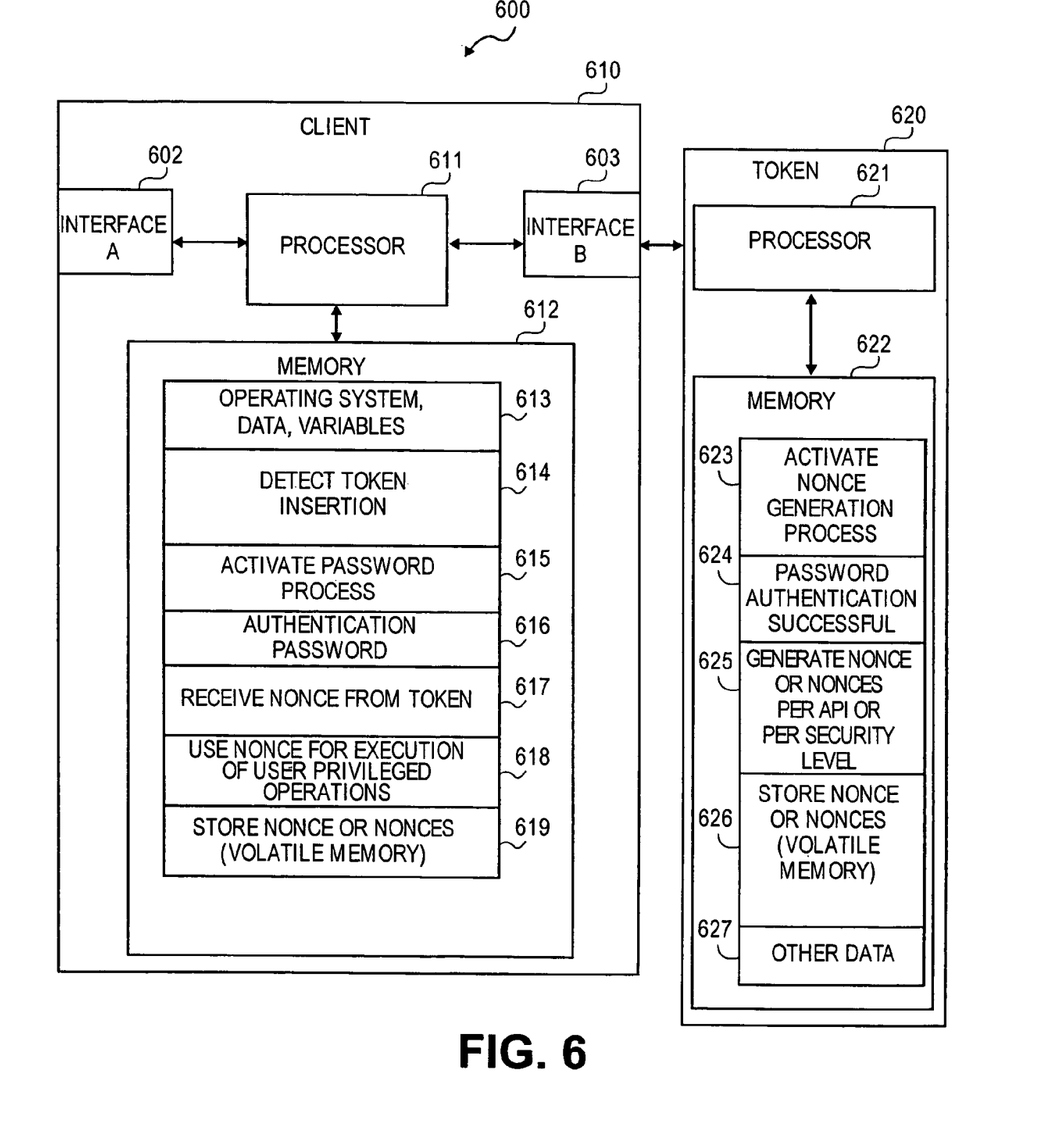
FIG. 6 is a block diagram, including functional blocks, illustrating an exemplary client computer with interfaces and a token.

An exemplary implementation environment 600 associated with the present invention can be seen in connection with FIG. 6. A client 610 and a token 630 are represented in an operative condition. The client 610 can include processor 611 and memory 612. The token 620 can include a processor 621 and a memory 622, which are more or less interchangeable with processor 210 and memory 211 as shown in FIG. 2, with the exception that, while FIG. 2 explicitly shows a volatile memory 213, the volatile memory has been omitted from FIG. 6 for simplicity. The memory 612 can include processes which can be loaded into the processor 611, such as an operating system, data and variables 613 and other processes as described below. Optionally, the client 610 can include an interface A 602 for connection to other entities such as a server over a communications link.

The token 620 can be inserted, for example into a token interface such as interface B 603, whereupon the insertion of the token is detected at 614. In response, a token based process such as a nonce generation process can be activated at 623. The client can activate a password process 615 based on a request generated by a client application process for execution of a user privileged operation. The password process will cause a password to be collected and passed to the token 620 for validation in a predetermined command format such as an ISO 7816 type format. It will be appreciated that while different formats may be used, an ADPU Command under ISO 7816, part 4, section 5.3 will be suitable for such a command because a response is included in which the nonce can be included. Thus, at 624, the password can be validated and a nonce generated at 625. As noted, one nonce can be generated for all application processes APIs or the like or different nonces can be generated based on security levels or on a per application process or API basis. The nonce can be passed to the client application process or API in a response to the command. The nonce can be stored in volatile memory at 626. It will be appreciated that other data such as privileged data objects can be stored at 627 and accessed for privileged operations as described herein above. When the nonce is passed to the client application process, it can be received at 617 and used in subsequent execution of user privileged operations at 618. The nonce or nonces can be stored in the client 610 in volatile memory at 619.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
receiving, by a token that comprises a volatile memory, a password while the token is coupled to a computer system;
validating, by the token, the password;
generating, by the token, a first nonce and a second nonce after successfully validating the password, wherein the first nonce and the second nonce are associated with different security levels;
storing the first nonce and the second nonce in the volatile memory until the token is de-coupled from the computer system, wherein the first nonce and the second nonce are erased from the volatile memory when the token is de-coupled from the computer system; and
providing the first nonce to a first application process that runs on the computer system and the second nonce to a second application process that runs on the computer system, wherein the first application process uses the first nonce and the second application process uses the second nonce to perform one or more user privileged operations.

2. The method of claim 1, wherein the one or more user privileged operations comprises at least one of: access to a resource associated with the computer system, access to a user privileged data object in the token, or logout.

3. The method of claim 1, wherein the first nonce and the second nonce are stored in a memory associated with the computer system.

4. The method of claim 1, wherein the token includes one of a smartcard and a universal serial bus (USB) token.

5. An apparatus comprising:
a memory; and
a processor to:
activate a login process in response to a request by a user to perform one or more user privileged operations;
receive a password from the user during the login process;
transmit the password to a token while the token is coupled to the apparatus;
receive a first nonce and a second nonce from the token after the password is successfully validated by the token, wherein the first nonce and the second nonce are associated with different security levels; and
execute a first application process that uses the first nonce and a second application process that uses the second nonce to perform the one or more user privileged operations;
wherein the first nonce and the second nonce are stored in a volatile memory of the token until the token is de-coupled from the apparatus, and wherein the first nonce and the second nonce are erased from the volatile memory when the token is de-coupled from the apparatus.

6. The apparatus of claim 5, wherein the one or more user privileged operations comprises at least one of: access to a resource, access to a user privileged data object in the token, or logout.

7. The apparatus of claim 5, wherein the processor is also to store the first nonce and the second nonce in the memory.

8. An apparatus comprising:
a volatile memory; and
a processor to:
receive a password via a command issued by a first application process executing on a computer system while the apparatus is coupled to the computer system;
generate a first nonce and a second nonce upon validation of the password, wherein the first nonce and the second nonce are associated with different security levels, and wherein the second nonce is generated based on a parameter associated with the command;
return the first nonce and the second nonce to the computer system, a first application process uses the first nonce and a second application process uses the second nonce to perform the one or more user privileged operations; and
store the first nonce and the second nonce in the volatile memory until the token is de-coupled from the computer system, wherein the first nonce and the second nonce are erased from the volatile memory when the token is de-coupled from the computer system.

9. The apparatus of claim 8 wherein the second nonce is returned to a second application process executing on the computer system.

10. The apparatus of claim 9, wherein the second application process is selected from a plurality of application processes based on respective security levels of the plurality of application processes.

11. The apparatus of claim 8, wherein the processor is also to:
receive a request to execute one or more user privileged operations; and execute the one or more user privileged operations when, and only when, a first value specified by the request matches the first nonce and a second value specified by the request matches the second nonce.

\* \* \* \* \*